(12) United States Patent
Page

(10) Patent No.: US 10,646,881 B1
(45) Date of Patent: May 12, 2020

(54) SYSTEM AND METHOD FOR SEPARATING AND COLLECTING CANNABIS

(71) Applicant: William Stacy Page, Ashland, OR (US)

(72) Inventor: William Stacy Page, Ashland, OR (US)

(*) Notice: Subject to any disclaimer, the term of this patent is extended or adjusted under 35 U.S.C. 154(b) by 385 days.

(21) Appl. No.: 15/623,552

(22) Filed: Jun. 15, 2017

Related U.S. Application Data

(60) Provisional application No. 62/360,650, filed on Jul. 11, 2016.

(51) Int. Cl.
| | |
|---|---|
| B02C 21/00 | (2006.01) |
| B02C 18/22 | (2006.01) |
| B02C 18/14 | (2006.01) |
| B02C 19/18 | (2006.01) |
| B02C 23/10 | (2006.01) |
| B02C 23/14 | (2006.01) |
| B07B 1/36 | (2006.01) |
| A47J 42/16 | (2006.01) |
| A47J 42/20 | (2006.01) |
| A47J 42/40 | (2006.01) |

(52) U.S. Cl.
CPC .............. B02C 21/00 (2013.01); A47J 42/16 (2013.01); A47J 42/20 (2013.01); A47J 42/40 (2013.01); B02C 18/142 (2013.01); B02C 18/2216 (2013.01); B02C 19/18 (2013.01); B02C 23/10 (2013.01); B02C 23/14 (2013.01); B07B 1/36 (2013.01); B07B 2201/04 (2013.01)

(58) Field of Classification Search
CPC ......... B02C 21/00; B02C 23/10; B02C 19/18; B02C 18/142; B02C 18/2216; B02C 23/14; A47J 42/40; A47J 42/20; A47J 42/16; B07B 1/36; B07B 2201/04
See application file for complete search history.

(56) References Cited

U.S. PATENT DOCUMENTS

| | | | |
|---|---|---|---|
| 3,053,259 A | | 4/1958 | Parmeme et al. |
| 2,992,154 A | * | 7/1961 | Mauthner ................ A24D 3/06 162/9 |
| 3,136,321 A | | 9/1964 | Davis |
| 3,424,170 A | | 1/1969 | Grunwald et al. |
| 3,567,139 A | * | 3/1971 | Andrae ................... B02C 15/02 241/17 |

(Continued)

Primary Examiner — Sean M Michalski
(74) Attorney, Agent, or Firm — Jerry Haynes Law

(57) ABSTRACT

A system and method for separating and collecting cannabis through separates cannabis into plant material, chaff, seeds, and kief; and then collects cannabis byproducts based on size, shape, and weight through separators, including, a screw conveyor, a mechanical vibrator, an ultrasonic mechanism, and a series of stacked classifiers. The method includes: loading unprocessed cannabis into an intake chamber; grinding the cannabis to reduce the size of plant material; carrying the cannabis upwardly through an inclined tube; delivering the cannabis to an elevated terminus at the upper end of the tube; passing the cannabis through stacked classifiers; shaking the cannabis to dislodge oil glands, resin trichomes, and kief from plant material; directing high frequency sound waves towards the cannabis to dislodge oil glands, resin trichomes, and kief from the plant material; and collecting herbaceous plant material, chaff, seeds, oil glands, and kief residue in separate containers.

20 Claims, 6 Drawing Sheets

(56) References Cited

U.S. PATENT DOCUMENTS

| | | | | |
|---|---|---|---|---|
| 3,647,150 | A * | 3/1972 | Stephanek | B02C 4/32 241/75 |
| 3,696,816 | A * | 10/1972 | Buchmann | A24B 15/12 131/370 |
| 3,710,805 | A * | 1/1973 | Tamaki | A24B 15/12 131/370 |
| 3,765,612 | A * | 10/1973 | Wenger | B02C 21/00 241/23 |
| 3,874,605 | A * | 4/1975 | Fleming | A01F 29/06 241/292 |
| 3,936,004 | A * | 2/1976 | Graf | B02C 13/04 241/5 |
| 4,084,753 | A * | 4/1978 | Fruh | B01F 13/10 241/188.1 |
| 4,306,574 | A | 12/1981 | Schlie et al. | |
| 4,512,521 | A * | 4/1985 | Johanning | A01D 87/0038 241/34 |
| 4,557,278 | A | 12/1985 | Brackmann et al. | |
| 4,616,663 | A | 10/1986 | Lorenzen et al. | |
| 5,090,093 | A * | 2/1992 | Kelly | B02C 23/10 241/101.2 |
| 5,390,862 | A * | 2/1995 | Eglin | B02C 13/04 241/101.76 |
| 5,402,950 | A * | 4/1995 | Blair | B02C 19/22 241/101.76 |
| 6,336,558 | B1 * | 1/2002 | Douglas | B62D 53/0821 198/313 |
| 8,882,008 | B1 * | 11/2014 | Viveen | B02C 23/02 241/101.74 |
| 9,266,116 | B1 * | 2/2016 | Doose | B02C 23/38 |
| 9,351,953 | B2 | 5/2016 | Stodola | |
| 9,380,813 | B2 | 7/2016 | McCullough | |
| 10,213,788 | B2 * | 2/2019 | Bates | A61K 36/00 |
| 10,349,780 | B2 * | 7/2019 | Dukat | A47J 42/14 |
| 2003/0154607 | A1 * | 8/2003 | Hamptaux | A01G 3/002 30/265 |
| 2008/0305236 | A1 * | 12/2008 | Tatarliov | A21D 2/36 426/590 |
| 2009/0004051 | A1 * | 1/2009 | Firestone | A61L 11/00 422/28 |
| 2009/0057449 | A1 * | 3/2009 | Forte | B02C 21/02 241/101.74 |
| 2009/0194463 | A1 * | 8/2009 | Isbell | B07B 1/28 209/36 |
| 2009/0283018 | A1 * | 11/2009 | Grasso, Jr. | B02C 17/22 106/709 |
| 2010/0059609 | A1 * | 3/2010 | Teeter, Jr. | B02C 9/04 241/11 |
| 2010/0252395 | A1 * | 10/2010 | Lehtonen | B02C 21/026 198/300 |
| 2011/0147500 | A1 * | 6/2011 | Saito | B02C 18/146 241/24.1 |
| 2015/0223523 | A1 | 8/2015 | McCullough | |
| 2016/0023365 | A1 | 1/2016 | Hall | |
| 2016/0143480 | A1 | 5/2016 | Watts et al. | |
| 2016/0151807 | A1 * | 6/2016 | Pau | B07B 13/003 209/682 |
| 2017/0001200 | A1 * | 1/2017 | Leffel | B02C 23/14 |
| 2017/0320095 | A1 * | 11/2017 | Lunnemann | B07B 1/4618 |
| 2017/0320098 | A1 * | 11/2017 | Knorr | B07B 1/284 |
| 2018/0065124 | A1 * | 3/2018 | Cecchi | B02C 18/06 |
| 2018/0301769 | A1 * | 10/2018 | Hanisch | C22B 1/005 |
| 2018/0311675 | A1 * | 11/2018 | Park | B02C 13/18 |
| 2018/0339298 | A1 * | 11/2018 | Mayers | B02C 23/10 |
| 2019/0039074 | A1 * | 2/2019 | Rose | B03B 5/48 |
| 2019/0150666 | A1 * | 5/2019 | Wozniak | A24F 47/00 |
| 2019/0193117 | A1 * | 6/2019 | Heinz Stahlhofer Bergmann | B07B 1/28 |
| 2019/0194585 | A1 * | 6/2019 | Vanevenhoven | A61K 36/185 |

* cited by examiner

SYSTEM AND METHOD FOR SEPARATING AND COLLECTING CANNABIS

CROSS-REFERENCE TO RELATED APPLICATIONS

This application claims the benefits of U.S. provisional application No. 62/360,650, filed Jul. 11, 2016 and entitled MULTI-STAGE CANNABIS PROCESSING SYSTEM AND METHOD, which provisional application is incorporated by reference herein in its entirety.

FIELD OF THE INVENTION

The present invention relates generally to a system and method for separating and collecting cannabis. More so, the present invention relates to a system and method that expeditiously processes cannabis to selectively separate and collect the herbaceous plant material, chaff, seeds, and kief that make up the cannabis based on size and weight through a multi-stage mechanical process of: loading unprocessed cannabis into an intake chamber; grinding the cannabis to reduce the size of a herbaceous plant material; carrying the cannabis through an inclined tube; delivering the cannabis to an elevated terminus at the upper end of the frame; passing at least a portion of the cannabis through a plurality of classifiers; shaking the cannabis at the classifiers to dislodge oil glands, resin trichomes, and kief from the herbaceous plant material; directing high frequency sound waves towards the cannabis, or the classifiers, or both to dislodge oil glands, resin trichomes, and kief from the herbaceous plant material; and collecting the herbaceous plant material, chaff, seeds, oil glands, and kief residue in a plurality of containers.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, cannabis plants are grown for processing into medicinal and recreational cannabis products. The legalization of cannabis has increased the demand for higher quality cannabis products at regulated prices. Often, growers of cannabis require solutions to increase harvest efficiency while maintaining quality. The growing and harvesting of cannabis plants is a multi-step process that was traditionally performed entirely by hand.

Typically, cannabis plants can be harvested and processed to obtain numerous kinds of chemical compounds used in medical products. For example, the compound tetrahydrocannabinol (THC) can be extracted from cannabis plants. Before obtaining this desired chemical, the cannabis must, however, first be separated into herbaceous plant material, chaff, seeds, oil glands, and kief residue. This is often performed manually, which can be time consuming and inefficient.

Other proposals have involved separating and collecting parts of the cannabis plant. The problem with these separation devices and gripping devices is that they do not magnify the force applied around the hose, and they are not efficient in separating the oil glands, resin trichomes, and kief from the plant material. Also, the separation is not adjustable to allow for different sizes and shapes. Even though the above cited separation devices meet some of the needs of the market, a multi-stage mechanical process that separates cannabis into plant material, chaff, seeds, and kief; and then collects the separated cannabis byproducts based on size, shape, and weight through use of various separators, including, a screw conveyor, a mechanical vibrator, an ultrasonic mechanism, and a series of stacked classifiers is still desired.

SUMMARY OF THE INVENTION

Illustrative embodiments of the disclosure are generally directed to a system and method for separating and collecting cannabis. The system and method processes cannabis through a multi-stage mechanical process that separates the cannabis into plant material, chaff, seeds, and kief. The system and method then collects the separated cannabis byproducts based on size and weight. Various separators, including, a screw conveyor, a mechanical vibrator, an ultrasonic mechanism, and a series of stacked classifiers are used to separate the cannabis in a desired dimension and shape for further processing or use.

In one embodiment, the method may include the steps of: loading unprocessed cannabis into an intake chamber; grinding the cannabis to reduce the size of a plant material; carrying the cannabis upwardly through an inclined tube; delivering the cannabis to an elevated terminus at the upper end of the tube; passing the cannabis through a plurality of classifiers; shaking the cannabis at the classifiers to dislodge oil glands, resin trichomes, and kief from the plant material; directing high frequency sound waves towards the cannabis to dislodge oil glands, resin trichomes, and kief from the plant material; and collecting the herbaceous plant material, chaff, seeds, oil glands, and kief residue in separate containers.

In some embodiments, the system for separating and collecting cannabis comprises a frame that is defined by an upper end and a lower end. The system also provides an intake chamber disposed at the upper end of the frame. The intake chamber is sized and dimensioned to receive unprocessed cannabis. A grinding mechanism is utilized for grinding the unprocessed cannabis.

In some embodiments, the system may include a tube defined by a lower end and an upper end. The tube is disposed to extend at a slope from the lower end of the frame to the upper end of the frame. The upper end of the frame terminates at an elevated terminus. The elevated terminus forms a discharge outlet.

In some embodiments, the system may also include a screw conveyor that is configured to operate concentrically through the tube. The screw conveyor comprises a shaft and a spiral blade configured to rotate in a helical pattern. In this manner, the spiral blade carries the grinded cannabis from the lower end of the tube to the elevated terminus.

In some embodiments, the system may include a motor carried by the frame. The motor is operatively connected to the screw conveyor, either at the upper end or the lower end of the frame. A gear mechanism is also carried by the frame. The gear mechanism operatively connects to the screw conveyor, whereby the motor and the gear mechanism rotate the screw conveyor.

In some embodiments, the system may include a plurality of classifiers disposed beneath the elevated terminus of the tube. The classifiers enable selective passage of the grinded and partially separated cannabis based on dimensions and shapes of the cannabis. Furthermore, a vibrating mechanism shakes the, such that vibrating the classifiers facilitates passage of the cannabis through the plurality of classifiers.

In some embodiments, the system may include an ultrasonic mechanism operable to emanating high frequency sound waves towards the cannabis. The high frequency sound waves help break the grinded and separated cannabis into smaller components. A plurality of containers are carried by the classifiers. The containers receive the grinded, separated, and broken cannabis.

In another aspect, the system is configured to process at least 50 pounds of cannabis per hour.

In another aspect, the plurality of classifiers are micron screens.

In another aspect, the plurality of classifiers comprises a classifier base, and a classifier wall forming a classifier cavity.

In another aspect, the plurality of classifiers further comprises a classifier mesh extending between the classifier wall, the classifier mesh defined by a plurality of mesh openings.

In another aspect, each classifier has differently sized and dimensioned mesh openings.

In another aspect, the smaller components of the cannabis include at least one member selected from the group consisting of: oil glands, resin trichomes, and kief.

In another aspect, the elevated terminus forms a discharge opening.

In another aspect, the grinding mechanism comprises a housing, an intake mouth, an outlet aperture, a plurality of abrasive members.

In another aspect, the grinding mechanism comprises a grind controller for controlling the speed and power of the plurality of abrasive members.

In another aspect, the plurality of abrasive members comprises a microscopic single-point cutting edge.

In another aspect, the ultrasonic mechanism comprises a vessel forming an opening, a dampener, and at least one transducer wire, the at least one transducer wire emanating the high frequency sound waves.

In another aspect, the ultrasonic mechanism comprises a controller for controlling the high frequency sound waves emanating from the ultrasonic mechanism.

One objective of the present invention is to separate, grind, and collect cannabis for harvesting in an efficient manner.

Another objective is to separate the cannabis through a systematic process of grinding with a grinder, tumbling with a screw conveyor, vibrating with a vibrating mechanism, applying sound waves with an ultrasonic mechanism, and shaking through a plurality of classifiers.

Yet another objective is to regulate the speed of the grinding, tumbling, vibrating, and shaking with various controllers.

Yet another objective is to separate the cannabis without damaging the integrity.

Yet another objective is to regulate the dimension and shape of the cannabis being separated.

Yet another objective is to provide an inexpensive to manufacture cannabis separation and collection system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
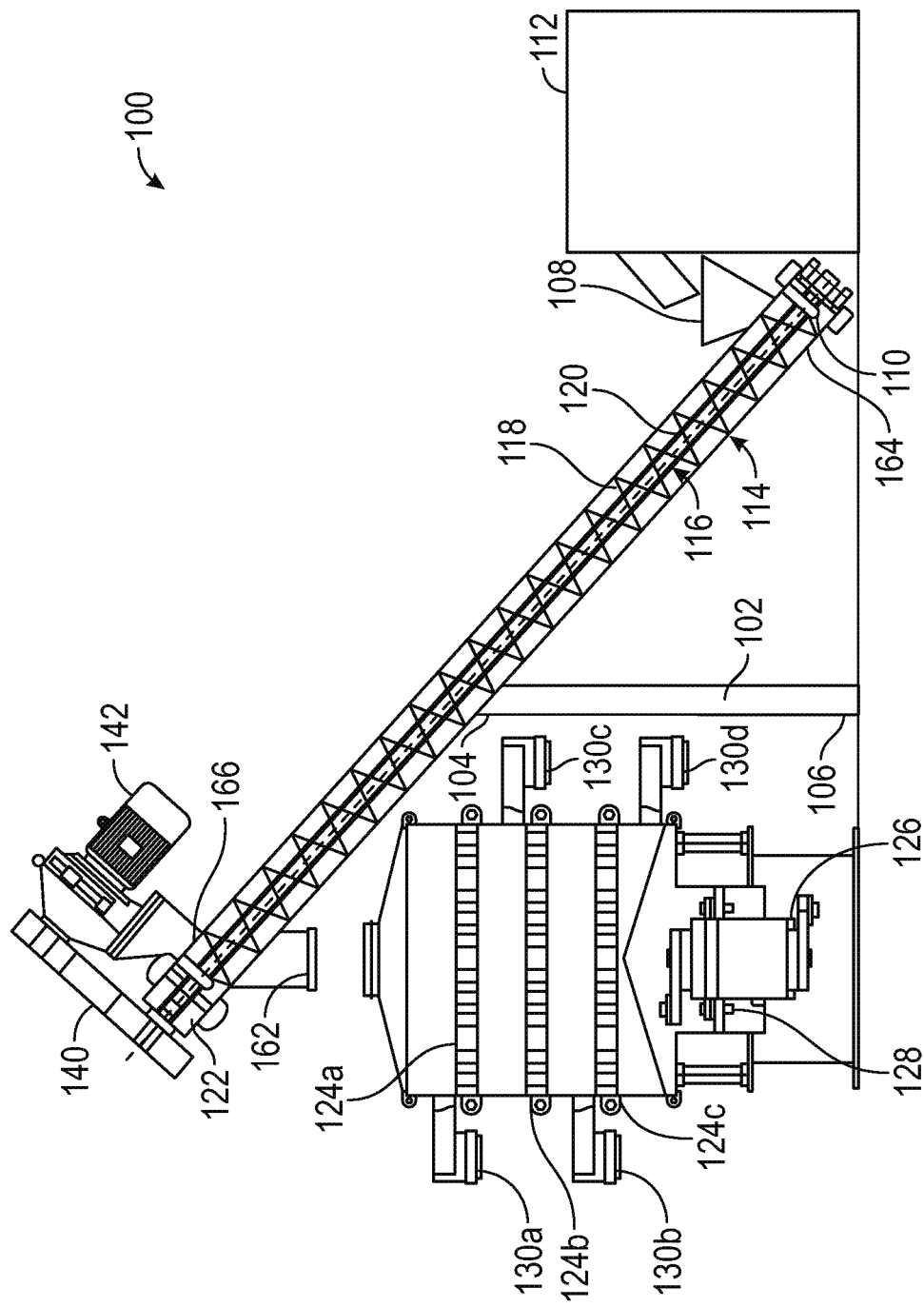
FIG. 1 illustrates an elevated side view of an exemplary system for separating and collecting cannabis, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system 100 and method 200 for separating and collecting cannabis is referenced in FIGS. 1-6. The system 100 expeditiously processes cannabis through a multi-stage mechanical process that separates the herbaceous plant material, chaff, seeds, and kief that make up the cannabis, and then collects the separated cannabis byproducts based on size and weight. In sequential multi-stages, the system

100 loads unprocessed cannabis, leverages gravity, rotary action, grinding action, tumbling action, vibratory forces, ultrasonic forces, and a sequential arrangement of micron classifiers to selectively segregate the cannabis byproducts into the desired sizes, or shapes, or both.

In one embodiment, the system 100 separates the cannabis by initially grinding with a grinding mechanism 110, tumbling with a screw conveyor 116, vibrating with a vibrating mechanism 126, applying sound waves with an ultrasonic mechanism 128, and finally shaking the cannabis through a plurality of classifiers 124a-c. The separated byproduct of the cannabis or vegetation material may include, without limitation, an oil, an herb, pollen, a chaff, a seed, a powder residue, and any organic byproduct associated with plants and vegetation for a variety of purposes. In alternative embodiments, the system 100 not only separates cannabis, but also separates and collects eclectic vegetation material, including, without limitation, an herb, a flower, a seed, a leaf, a tree, a weed, a vegetable, a fruit, and a multicellular eukaryotes of the kingdom Plantae.

As FIG. 1 references, the system 100 comprises a frame 102 that provides structural support to support the weight of the cannabis and the mechanical agitation of the various separating mechanisms 116, 126, 128, 124a-c. The frame 102 also serves to elevate the cannabis, so as to leverage gravitational effects while sieving the cannabis through the classifiers 124a-c.

In some embodiments, the frame 102 may be defined by an upper end 104 and a lower end 106. The upper end 104 allows for adjustable elevation. Thus, the frame 102 allows unprocessed cannabis to be loaded at a lower elevation, carried to an upper elevation, and then, under influence of gravity, the subsequently processed cannabis passes through a sequence of classifiers 124a, 124b, 124c to be collected back at the lower elevation.

The frame 102 may take numerous forms, including a tower, a tripod, and simply a bracket with elongated legs. In some embodiments, the frame 102 may include a pair of angled frame legs. A pair of elongated, parallel, spaced-apart, upward-standing frame arms may extend from between the frame legs. Each frame leg may include a pair of spaced-apart side leg members which extend at an angle from the respective frame arms. A bottom leg member may extend between the side leg members. This is, however, only one possible design for the frame 102.

An intake chamber 108 positions at the lower end 106 of the frame 102. The intake chamber 108 receives unprocessed cannabis from a loading mechanism 112. The loading mechanism, shown in FIG. 3, may also include a bin, a conveyor, a truck, or a crane. It is significant to note that the system 100 operates as a continuous feed machine that can process at least 50 pounds of cannabis material per hour. Thus, the intake chamber 108 is configured to constantly receive cannabis from the loading mechanism 112 for processing. The intake chamber 108 is also configured to be weatherproof and heavy duty. In some embodiments, the loading mechanism 112 and the intake chamber 108 may be automated and unmanned.

Figure 2:
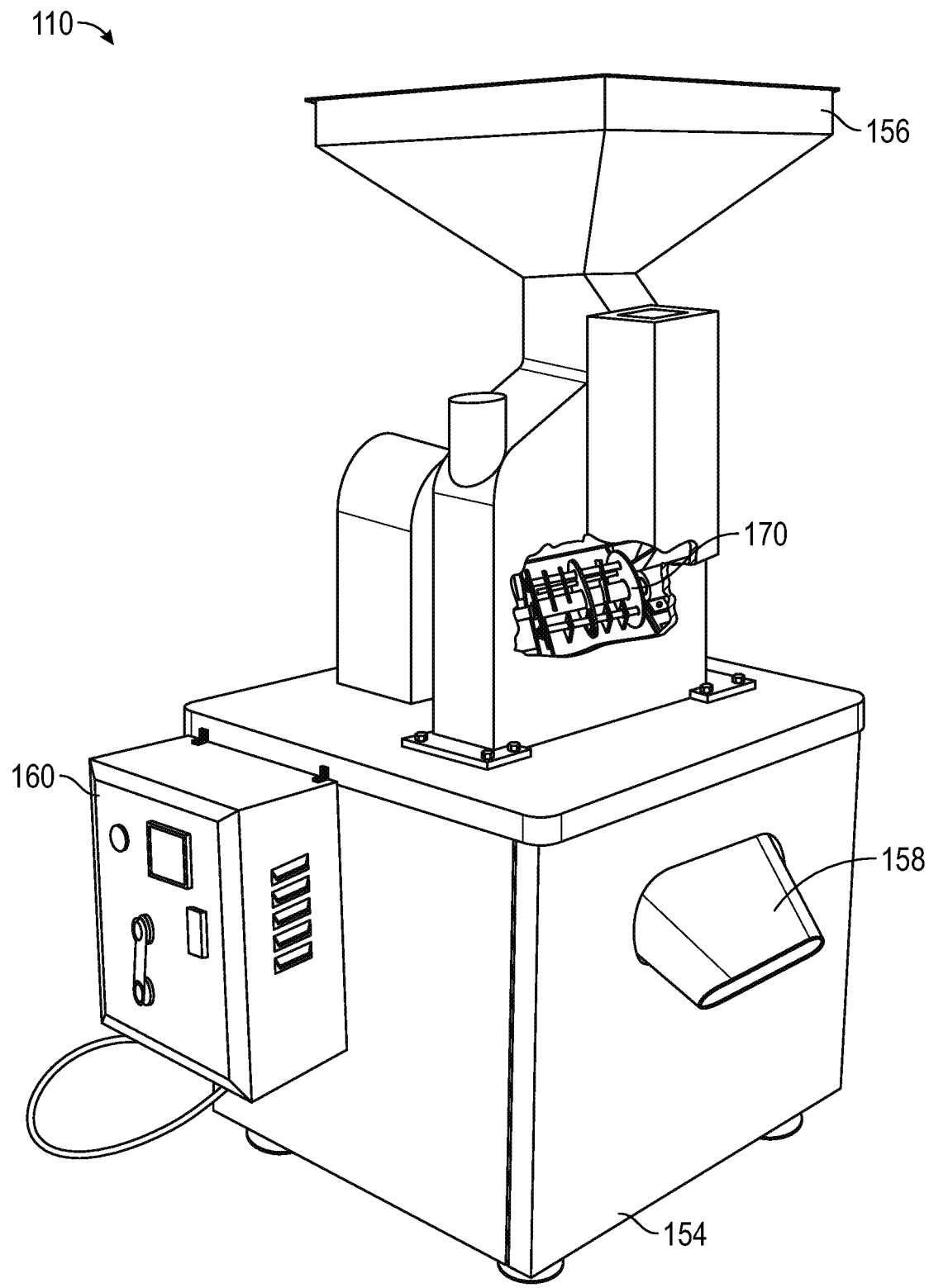
FIG. 2 illustrates a perspective view of an exemplary grinding mechanism with a sectioned portion illustrating a plurality of abrasive members for grinding cannabis, in accordance with an embodiment of the present invention.

Looking now at FIG. 2, a grinding mechanism 110 is operable near the intake chamber 108. The grinding mechanism 110 works to grind, or abrasively cut, the unprocessed cannabis upon unloading from the loading mechanism 112. The grinding mechanism 110 may provide a housing 154 to receive and contain the cannabis that is to be grinded. The housing 154 has an intake mouth 156 for receiving unprocessed cannabis and an outlet aperture 158 for discharging cannabis after grinding.

The grinding mechanism 110 grinds the cannabis through use of a plurality of abrasive members 170. The abrasive members 170 directly engage the cannabis, as each contact point of the abrasive members 170 grinds, tears, rips, and punctures the cannabis leaves and stems into a ground arrangement. In one possible embodiment, the abrasive members 170 comprise a microscopic single-point cutting edge. Though in other embodiments, any sharp metal apparatus for cutting leafy material may be used as an abrasive member. In one embodiment, a grind controller 160 regulates the speed and power of the abrasive members 170. This control of the grinding effect creates an efficient means to break down the larger components of the cannabis, such as herbaceous plant material and chaff.

Those skilled in the art will recognize that the highly mechanical aspects of grinding generates heat. Thus, in one possible embodiment, the grinding mechanism 110 is cooled by a fluid, such as water, oil, or air flow that carries heat away from the abrasive members. The cooling effect on the grinding mechanism 110 serves to reduce heat accumulation in the cannabis and on the abrasive members as they engage to grind the cannabis and generally reduce the size of the cannabis. Those skilled in the art will also recognize that manipulating the temperature of the cannabis can affect yield at a subsequent processing stage. The cannabis may also be cooled while being transported, as discussed below.

Figure 3:
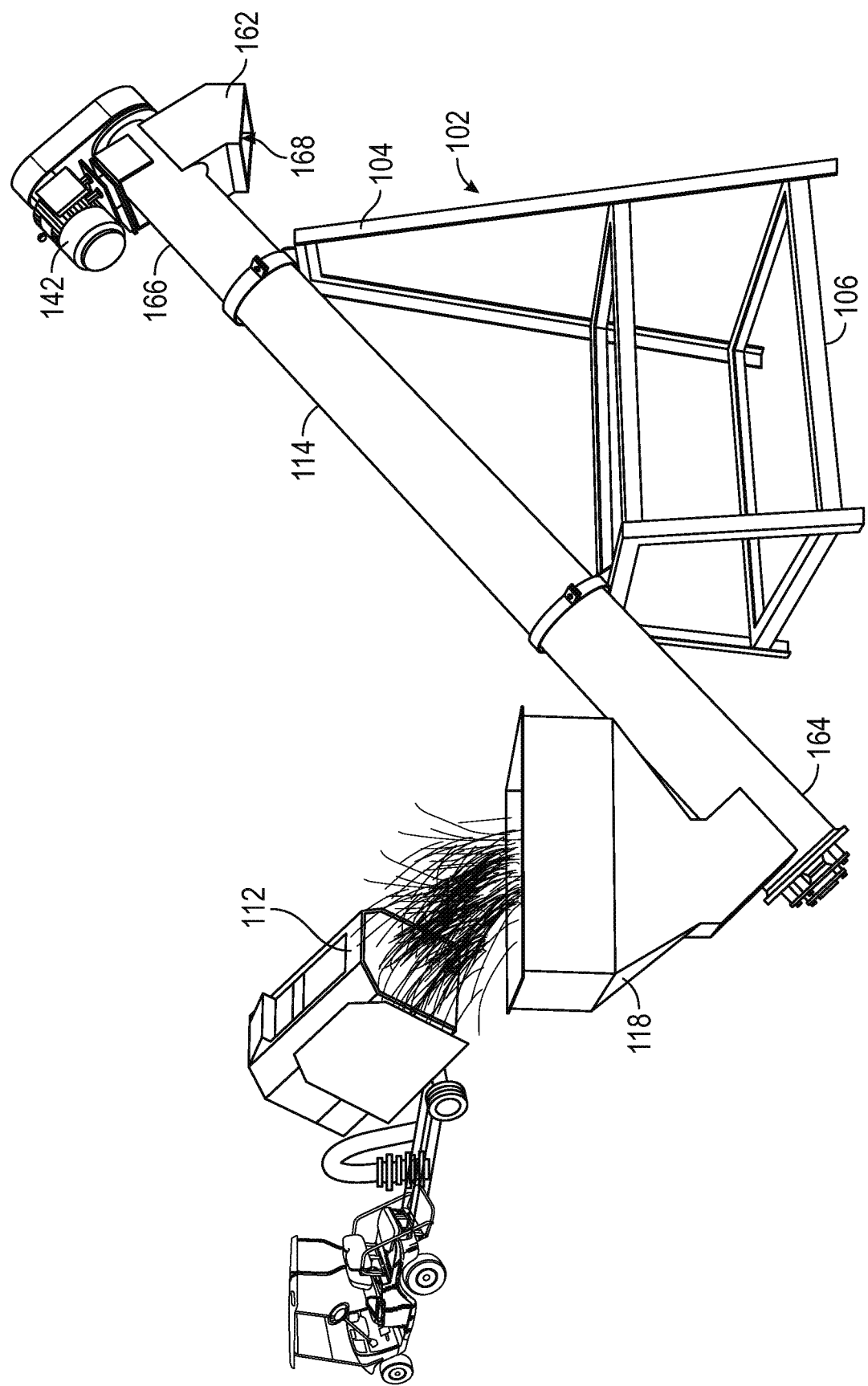
FIG. 3 illustrates a perspective view of an exemplary sloped tube extending from an elevated end to a lower end of a frame, in accordance with an embodiment of the present invention.

As illustrated in FIG. 3, the system 100 further comprises a tube 114 defined by a lower end 164 and an upper end 166. The lower end 164 is in communication with the intake chamber 108. The upper end 166 terminates at an elevated terminus 162 that is defined by a discharge outlet 168. The tube 114 extends at a slope from the grinding mechanism 110 to approximately the upper end 104 of the frame 102. The sloped tube 114 is used primarily to transport the cannabis from the intake chamber 108 to the elevated terminus 162 for further processing and gravity-actuated collection.

In one embodiment, the tube 114 has a circumference that is suited to carrying about 50 pounds of cannabis per hour. The length of the tube 114 may be about 1900 mm in one embodiment. Due to the inclined disposition of the tube 114, at least part of the transport of the cannabis the cannabis is constantly tumbling in the tube 114, which serves to break down larger components, such as herbaceous plant material and chaff. In some embodiments, the inner surface of the tube 114 may also be coated with a material to induce sliding by the cannabis and byproducts thereof.

In some embodiments, a cooling fluid, such as water, oil, or air may flow along the length of the tube 114. For example, the tube 114 may have two continuous sidewalls that carry chilled water pipes therebetween. As in the grinding mechanism 110, manipulating the temperature of the cannabis can affect yield at a subsequent processing stage.

A screw conveyor 116 operates concentrically through the tube 114 to carry the cannabis upwardly through the tube 114. The screw conveyor 116 is defined by a spiral blade 118 that coils around a shaft 120. The shaft 120 is driven at one end of the tube 114 by a motor 142 and a gear mechanism 122. In this manner, the shaft 120 and spiral blade 118 are configured to rotate in a helical pattern, which is effective for carrying the cannabis to the elevated terminus at the upper end 166 of the tube 114.

The screw conveyor 116 works to extrude the cannabis from the intake chamber 108 to an elevated terminus 162 of the tube 114, and onto a plurality of classifiers 124a, 124b, 124c. The capacity to propel the cannabis upwardly is due to the helical pattern of the spiral blade 118 acting on the herbaceous plant material.

In some embodiments, the shaft 120 may rotate about an axis and be secured by a pair of mounting members at the ends. The shaft 120 may be controlled from one end or operate freely, as is known in the art. Further, the angle of the spiral blade 118 may be changed to accommodate different types of cannabis and larger components thereof. It is significant to note that the rate of volume transfer of cannabis by the screw conveyor 116 is proportional to the rotation rate of the shaft 120. In one embodiment, the screw conveyor 116 is used as a variable rate feeder by varying the rotation rate of the shaft 120 to deliver a measured rate or quantity of the cannabis.

In some embodiments, a motor 142 and gear mechanism 122 are carried by the frame 102. The motor 142 and the gear mechanism 122 may be secured at the upper end 104 through a mount. However in some embodiments, the motor 142 is disposed at the lower end 106 of the frame 102. In either position, the motor and gear mechanism 122 work to power and control the screw conveyor 116, including the rotation rate of the shaft 120.

The screw conveyor 116 works to extrude the cannabis from the intake chamber 108 to an elevated terminus 162 of the tube 114, and onto a plurality of classifiers 124a, 124b, 124c. The classifiers 124a, 124b, 124c are sequentially stacked from the elevated terminus 162 of the tube 114 to the lower end 106 of the frame 102. As FIG. 1 illustrates, the classifiers 124a, 124b, 124c are disposed beneath the tube 114 in a sequential arrangement to catch the cannabis falling from the elevated terminus 162 of the tube 114 under the influence of gravity, so as to optimize reception of the cannabis.

In some embodiments, the processed cannabis passes through a sequence of classifiers 124a, 124b, 124c. The classifiers 124a-c sieve the grinded and tumbled cannabis into smaller components. The classifiers 124a-c are configured in a stacked arrangement, so that gravity helps in separation. The processed cannabis is under influence of gravity to be collected at the lower elevation. Furthermore, the method 200 allows for adding and removing classifiers 124a-c from the system 100, so as to adjustably affect the size parameters of the collected cannabis byproducts.

In this manner, herbaceous plant material, chaff, seeds, oil glands, and kief that make up the cannabis are separated accordingly, based on size, or shape, or both by the classifiers 124a, 124b, 124c. When sized in microns, the classifiers 124a-c are, however, especially effective efficacious for separating the smaller components of the cannabis, such as oil glands, resin trichomes, and kief.

Figure 4:
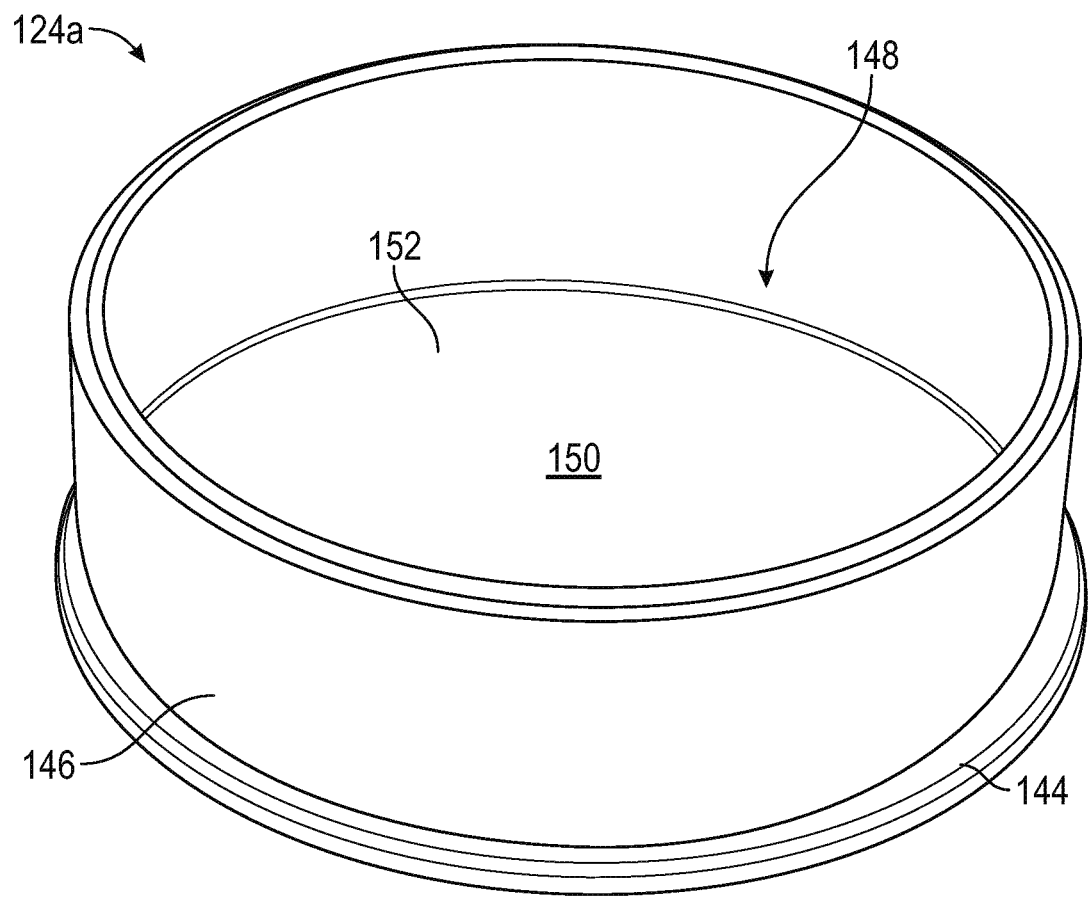
FIG. 4 illustrates a perspective view of an exemplary classifier, in accordance with an embodiment of the present invention.

An exemplary classifier 124a is shown in FIG. 4. Here, the classifier comprises a classifier base 144; a classifier wall 146 extending from the classifier base 144; a classifier cavity 148 formed by the classifier wall 146; and a classifier mesh 150 extending across the classifier wall 146. The classifier mesh 150 is defined by a plurality of mesh openings 152. In some embodiments, each classifier 124a-c can have differently sized and dimensioned mesh openings 152. Furthermore, the shape, dimensions, and quantity of classifiers 124a-c may be altered to accommodate different cannabis types and desired sizes and shaped of processed cannabis.

In some embodiment, the classifiers 124a-c may include micron screens configured to separate the smallest components of the cannabis, such as oil glands, resin trichomes, and kief into different sizes and shapes. Those skilled in the art will recognize that kief can include the resinous trichomes of cannabis that may accumulate in containers or sifted from loose, dry cannabis flower with a mesh screen or sieve. Thus, by utilizing a micro-filter, such as micron screens to separate the cannabis, the microscopic components of cannabis, such as kief residue can be separated by micron sizes.

The system 100 utilizes both vibratory and ultrasonic forces to further separate the cannabis into smaller components, and also to help force the cannabis through the classifiers 124a-c. The grinding mechanism 110 and the tumbling action from the spiral blade 118 apply mechanical forces to break down larger components of the cannabis, i.e., herbaceous plant material, chaff, seeds. The smaller components of the cannabis, i.e., oil glands, resin trichomes, and kief require, however, separation through the micron sized classifiers, vibratory actions of a vibrating mechanism 126, and high frequency sound waves of an ultrasonic mechanism 128.

In some embodiments, the system provides a vibrating mechanism 126 that applies a vibratory action to the classifiers 124a-c. The vibratory action helps shake oil glands from the herbaceous plant material, chaff, and seeds. The physical shock of the agitation, as applied to the cannabis, is effective for dislodging smaller components from the herbaceous plant material. The vibratory action is especially effective in dislodging oil glands from herbaceous plant material because the interfacial tension that holds the surface of oil glands to the surface of the herbaceous material is approximately 10-30 dynes/cm.

Thus, to overcome this adhering surface tension a vibratory action is effective. In some embodiments, where the classifiers 124a-c are integrated immediately at the elevated terminus 162 of the tube 114, the vibrating mechanism 126 operatively attaches to the tube 114 to shake the tube 114 rather than the classifiers 124a-c. The vibrating mechanism 126 may include a vibrating motor and a dampener, as known in the art.

Figure 5:
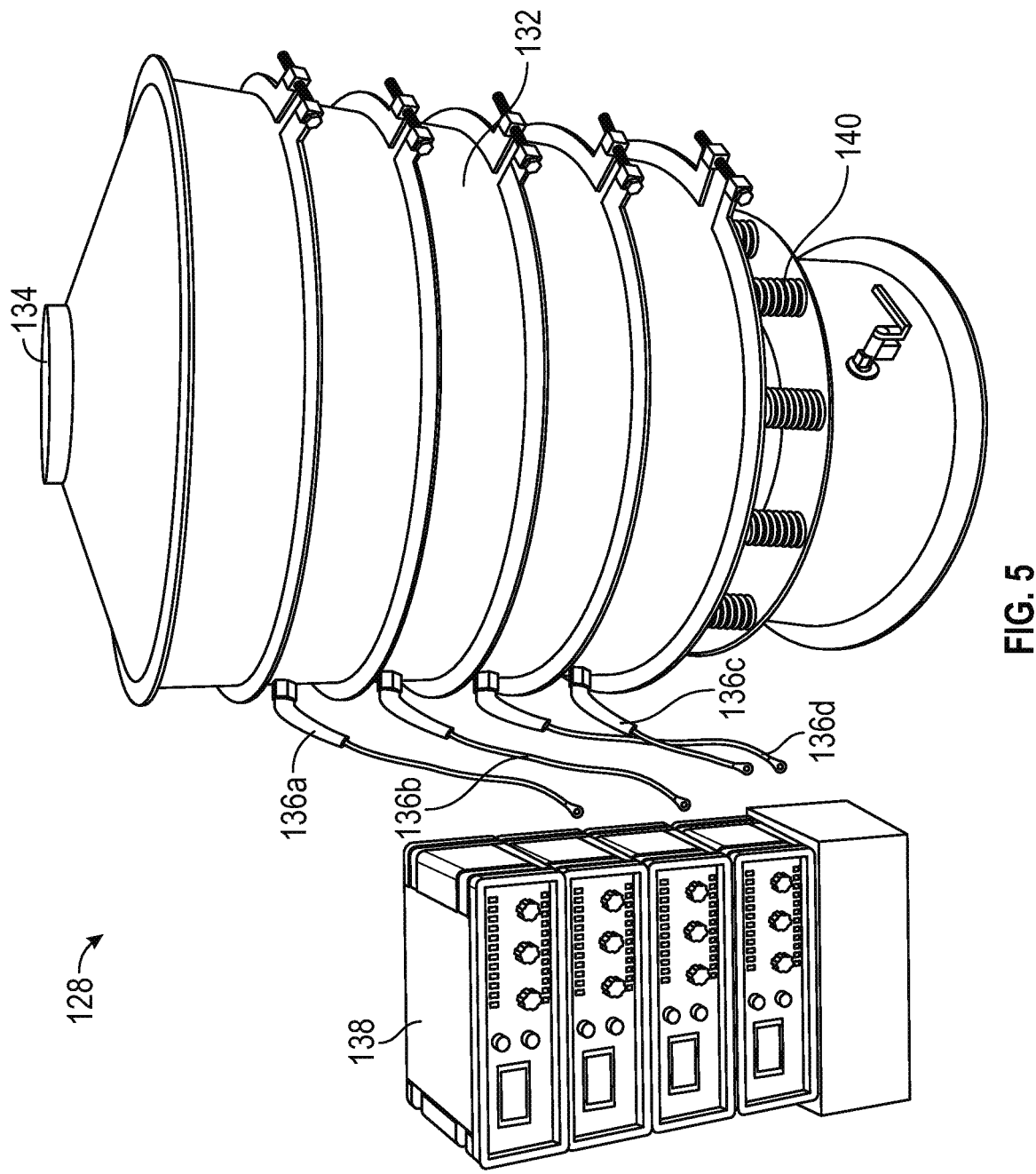
FIG. 5 illustrates a perspective view of an exemplary ultrasonic mechanism, in accordance with an embodiment of the present invention.

As shown in FIG. 5, the system 100 further comprises an ultrasonic mechanism 128 that directs high frequency sound waves towards the cannabis, or the classifiers 124a-c, or both. The high frequency sound waves help dislodge oil glands, resin trichomes, and kief from the herbaceous plant material. In some embodiments, the ultrasonic mechanism 128 may include a vessel 132, an opening 134 for feeding cannabis into the vessel, at least one ultrasound transducer wire 136a, 136b, 136c, 136d for inducing the high frequency sound waves. In one embodiment, a dampener 140 rests beneath the vessel 132 to help level the vessel as the weight of the cannabis increases.

In one embodiment, a controller 138 is operatively connected to regulate the frequencies of the ultrasound transducer wire 136a-d. In this manner, the size and type of the oil glands, resin trichomes, and kief being separated from the herbaceous plant material can be more easily controlled. The controller 138 can be operatively connected to the ultrasound transducer wire 136a-d either wirelessly, or through a hard wire.

The high frequency sound waves are generally sound waves with frequencies higher than the upper audible limit of humans. The high frequency sound waves are directed either directly towards the cannabis in the tube 114, or the cannabis in classifiers 124a-c, or both.

Those skilled in the art will recognize that the high frequency sound waves provide a more intense, focused force to dislodge the smaller residue, such as oil glands, resin trichomes, and kief from the herbaceous plant material. This enhances the effect of the classifiers 124a-c during separation. It is significant to note that while the oil glands, resin trichomes, and kief would eventually pass through the smallest of classifiers 124a-c, the focused high frequency sound waves generated by the ultrasonic mechanism 128 expedites the separation.

In one alternative embodiment, a single mechanism combines both vibratory action and high frequency sound waves to separate the oil glands, resin trichomes, and kief from the larger components of the cannabis. In any case, both vibratory action and high frequency sound waves are utilized to create a synergy of focused, intense forces to dislodge the smallest component of the cannabis, i.e., oil glands, resin trichomes, and kief, without damaging the cannabis.

Looking back at FIG. 1, a plurality of containers 130a, 130b, 130c, 130d are used to capture and store respective components of the cannabis. The container 130a may include a continuous sidewall, a base, and an opening. The containers 130a-d may be carried by the classifiers 124-c, or disposed directly beneath the classifiers 124a-c, or even attached adjacently to the classifiers 124a-c. In any case, the containers 130a-d receive the plant material directly from the classifiers 124a-c.

The containers 130a-d are sized and dimensioned to capture a specific size and shape of cannabis component. In one exemplary use, multiple classifiers 124a-c are placed on respective containers 130a-c. In the example illustrated, a first classifier 124a is placed on a first container 130a; a second classifier 124b is placed on a second container 130b; and a third classifier 124c is placed on a third container 130c. The mesh openings 152 in the classifier mesh of the first classifier 124a, the second classifier 124b, and the third classifier 124c have different sizes for selectively separating and harvesting the cannabis byproducts, and especially the smaller components such as oil glands, resin trichomes, and kief.

Thus, after the smaller components of the cannabis are dislodged from the herbaceous plant material and chaff through vibratory actions and high frequency sound waves, the classifiers 124a-c, which may have variously sized mesh openings, enable selective passage of the byproduct into the containers 130a-d for sorting and storage.

In one alternative embodiment, a hybrid container serves as a classifier that inhibits a specifically sized cannabis component from passing through, but allows smaller components of the cannabis to pass to a subsequent classifier or container. In essence, the classifiers and the containers are combined into a hybrid container.

Figure 6:
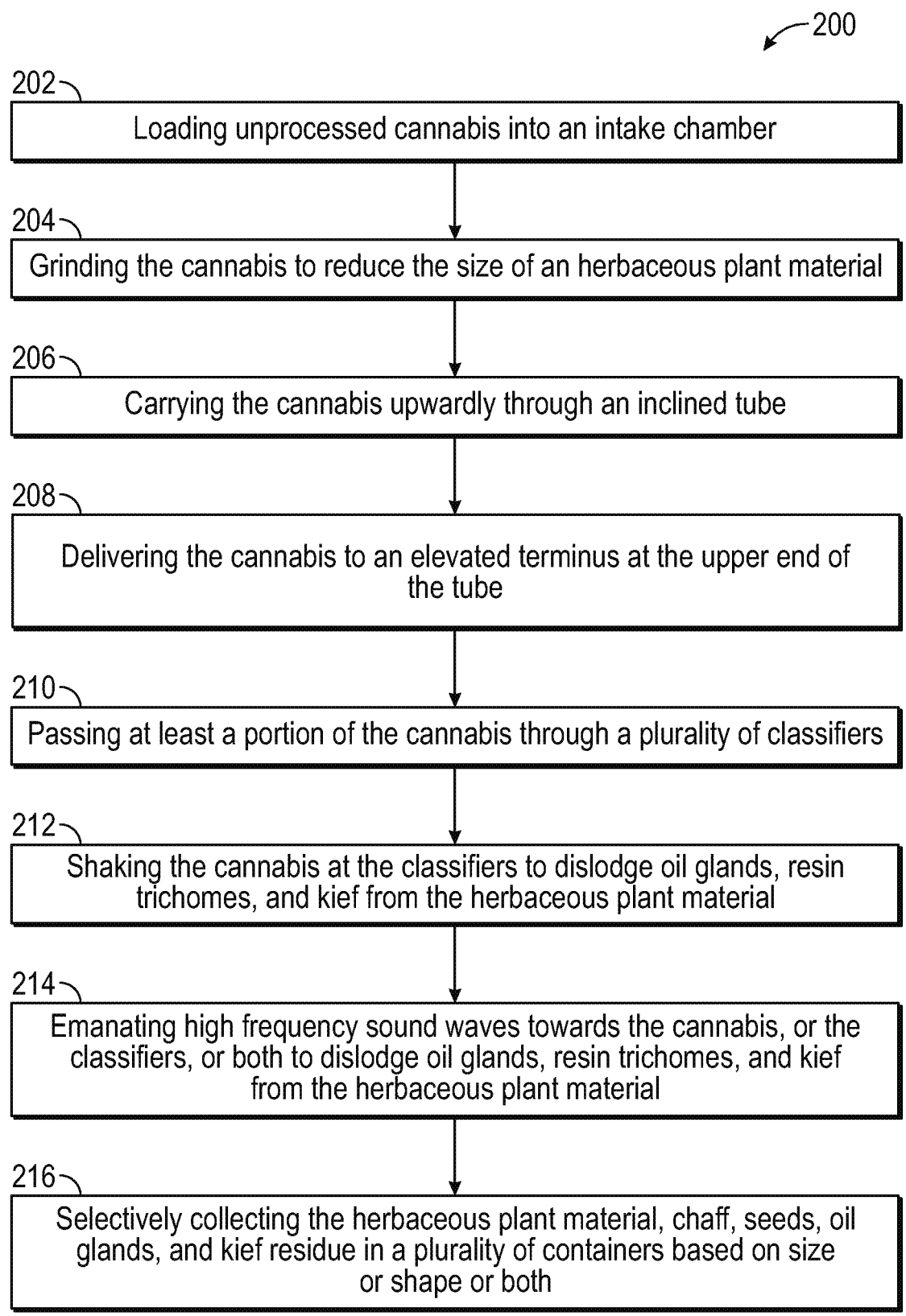
FIG. 6 illustrates a flowchart of an exemplary method for separating and collecting cannabis, in accordance with an embodiment of the present invention.

FIG. 6 illustrates a flowchart diagram of an exemplary method 200 for processing cannabis. The method 200 enables the system 100 to expeditiously process cannabis through a multi-stage mechanical process that separates the herbaceous plant material, chaff, seeds, and kief that make up the cannabis, and then collects the separated cannabis byproducts based on size and weight. In one embodiment, the method 200 comprises an initial Step 202 of loading unprocessed cannabis into an intake chamber 108. An intake chamber 108 positions at the lower end 106 of the frame 102. The intake chamber 108 receives unprocessed cannabis from a loading mechanism 112, such as a bin, a conveyor, a truck, or a crane.

A subsequent Step 204 includes grinding the cannabis to reduce the size of an herbaceous plant material. The grinding mechanism 110 is operable near the intake chamber 108. The grinding mechanism 110 works to grind, or abrasively cut, the unprocessed cannabis upon unloading from the loading mechanism 112. A Step 206 may include carrying the cannabis upwardly through an inclined tube 114. The capacity to propel the cannabis upwardly while simultaneously breaking down the herbaceous plant material, chaff, and seeds is partially due to the helical pattern of the spiral blade 118 acting on the larger herbaceous plant material.

A Step 208 may include delivering the cannabis to an elevated terminus 162 at the upper end of the tube 114. In one embodiment, the inclined tube 114 slopes at about 42°. Though other slopes may be used, depending on the weight of the cannabis, the moisture content of the cannabis, and the desired speed to process the cannabis. The elevated terminus 162 may include an opening that enables passage and discharge of the cannabis.

For this purpose, a screw conveyor 116 passes concentrically through the tube 114. The screw conveyor 116 carries the cannabis and churns the cannabis along the length of the tube 114 in an upward direction to separate the larger herbaceous plant material from seeds and chaff. The screw conveyor 116 is defined by a spiral blade 118 coiled around a shaft 120. The shaft 120 is driven at one end of the tube 114 by a motor 142 and gear mechanism 122. The shaft 120 and spiral blade 118 are configured to rotate in a helical pattern, which is effective for tumbling and agitating the cannabis.

A Step 210 includes passing at least a portion of the cannabis through a plurality of classifiers 124a, 124b, 124c. The processed cannabis passes through a sequence of classifiers 124a, 124b, 124c under influence of gravity to be collected at the lower elevation. The herbaceous plant material, chaff, seeds, oil glands, and kief that make up the cannabis are separated accordingly, based on size, or shape, or both by the classifiers 124a-c. When sized in microns, the classifiers 124a-c are, however, especially effective efficacious for separating the smaller components of the cannabis.

A Step 212 may include shaking the cannabis at the classifiers 124a-c to dislodge oil glands, resin trichomes, and kief from the herbaceous plant material. A vibrating mechanism 126 applies a vibratory action to the classifiers 124a-c to help shake oil glands from the herbaceous plant material, chaff, and seeds. The physical shock of the agitation, as applied to the cannabis, is effective for dislodging smaller components from the herbaceous plant material.

A Step 214 emanating high frequency sound waves towards the cannabis, or the classifiers 124a-c, or both to dislodge oil glands, resin trichomes, and kief from the herbaceous plant material. The high frequency sound waves are generally sound waves with frequencies higher than the upper audible limit of humans. The high frequency sound waves are directed either directly towards the cannabis in the tube 114, or the cannabis in classifiers 124a-c, or both to provide a more intense, focused force to dislodge the smaller residue, such as oil glands, resin trichomes, and kief from the herbaceous plant material. A final Step 216 comprises selectively collecting the herbaceous plant material, chaff, seeds, oil glands, and kief residue in a plurality of containers 130a-d based on size or shape or both. The containers 130a-d are used to capture and store respective components of the cannabis.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalence.

What is claimed is:

1. A system for separating and collecting cannabis, the system comprising:
    a frame defined by an upper end and a lower end;
    an intake chamber disposed at the upper end of the frame, the intake chamber sized and dimensioned to receive unprocessed cannabis;
    a grinding mechanism for grinding the unprocessed cannabis;
    a tube defined by a lower end and an upper end, the tube disposed to extend at a slope from the lower end of the frame to the upper end of the frame, the upper end of the frame terminating at an elevated terminus, the elevated terminus forming a discharge outlet;
    a screw conveyor configured to operate concentrically through the tube, the screw conveyor comprising a shaft and a spiral blade configured to rotate in a helical pattern;
    a motor carried by the frame, the motor operatively connected to the screw conveyor;
    a gear mechanism carried by the frame, the gear mechanism operatively connected to the screw conveyor;
    a plurality of classifiers disposed beneath the elevated terminus of the tube, the plurality of classifiers enabling selective passage of the grinded and partially separated cannabis based on dimensions and shapes of the cannabis;
    a vibrating mechanism operable to shake the plurality of classifiers,
    whereby vibrating the plurality of classifiers facilitates passage of the cannabis through the plurality of classifiers;
    an ultrasonic mechanism emanating high frequency sound waves; and
    a plurality of containers carried by the plurality of classifiers.

2. The system of claim 1, wherein the plurality of classifiers are micron screens.

3. The system of claim 2, wherein the plurality of classifiers comprises a classifier base, and a classifier wall forming a classifier cavity.

4. The system of claim 3, wherein the plurality of classifiers further comprises a classifier mesh extending between the classifier wall, the classifier mesh defined by a plurality of mesh openings.

5. The system of claim 4, wherein each classifier has differently sized and dimensioned mesh openings.

6. The system of claim 1, wherein the elevated terminus forms a discharge opening.

7. The system of claim 1, wherein the grinding mechanism comprises a housing, an intake mouth, an outlet aperture, a plurality of abrasive members.

8. The system of claim 7, wherein the grinding mechanism comprises a grind controller for controlling the speed and power of the plurality of abrasive members.

9. The system of claim 8, wherein the plurality of abrasive members comprises a cutting edge.

10. The system of claim 9, wherein the ultrasonic mechanism comprises a vessel forming an opening, a dampener, and at least one transducer wire, the at least one transducer wire emanating the high frequency sound waves.

11. The system of claim 10, wherein the ultrasonic mechanism comprises a controller for controlling the high frequency sound waves emanating from the ultrasonic mechanism.

12. The system of claim 11, wherein the smaller components of the cannabis include at least one member selected from the group consisting of: oil glands, resin trichomes, and kief.

13. The system of claim 12, wherein the system is configured to process at least 50 pounds of cannabis per hour.

14. A system for separating and collecting cannabis, the system comprising:
    a frame defined by an upper end and a lower end;
    an intake chamber disposed at the upper end of the frame, the intake chamber sized and dimensioned to receive unprocessed cannabis;
    a grinding mechanism for grinding the unprocessed cannabis, the grinding mechanism comprising a housing, an intake mouth, an outlet aperture, a plurality of abrasive members;
    a tube defined by a lower end and an upper end, the tube disposed to extend at a slope from the lower end of the frame to the upper end of the frame, the upper end of the frame terminating at an elevated terminus, the elevated terminus forming a discharge outlet;
    a screw conveyor configured to operate concentrically through the tube, the screw conveyor comprising a shaft and a spiral blade configured to rotate in a helical pattern;
    a motor carried by the frame, the motor operatively connected to the screw conveyor;
    a gear mechanism carried by the frame, the gear mechanism operatively connected to the screw conveyor;
    a plurality of classifiers disposed beneath the elevated terminus of the tube, the plurality of classifiers enabling selective passage of the grinded and partially separated cannabis based on dimensions and shapes of the cannabis, the plurality of classifiers comprising a classifier base, and a classifier wall forming a classifier cavity, the plurality of classifiers further comprising a classifier mesh extending between the classifier wall, the classifier mesh defined by a plurality of mesh openings;
    a vibrating mechanism operable to shake the plurality of classifiers,
    whereby vibrating the plurality of classifiers facilitates passage of the cannabis through the plurality of classifiers;
    an ultrasonic mechanism emanating high frequency sound waves;
    a controller for controlling the high frequency sound waves emanating from the ultrasonic mechanism; and
    a plurality of containers carried by the plurality of classifiers.

15. The system of claim 14, wherein the plurality of abrasive members comprises a cutting edge.

16. The system of claim 14, wherein the ultrasonic mechanism comprises a dampener and a vessel forming an opening.

17. The system of claim 14, wherein the ultrasonic mechanism comprises at least one transducer wire for emanating the high frequency sound waves.

18. The system of claim 14, wherein each classifier has differently sized and dimensioned mesh openings.

19. The system of claim 14, wherein the plurality of classifiers are micron screens.

20. A method for separating and collecting cannabis, the method comprising:
    loading unprocessed cannabis into an intake chamber;
    grinding the cannabis to reduce the size of the herbaceous plant material;

carrying the cannabis upwardly through an inclined tube;
delivering the cannabis to an elevated terminus at the upper end of the tube;
passing at least a portion of the cannabis through a plurality of classifiers;
shaking the cannabis at the classifiers;
emanating high frequency sound waves towards the cannabis, or the classifiers, or both, whereby the physical shaking and impact from soundwaves dislodges oil glands, resin trichomes, and kief from the herbaceous plant material; and
selectively collecting the herbaceous plant material, chaff, seeds, oil glands, and kief residue in a plurality of containers based on size or shape or both.

* * * * *